(No Model.) 3 Sheets—Sheet 1.
J. C. DE LA VERGNE & W. M. MIXER.
Ice Making Machinery.
No. 237,372. Patented Feb. 8, 1881.
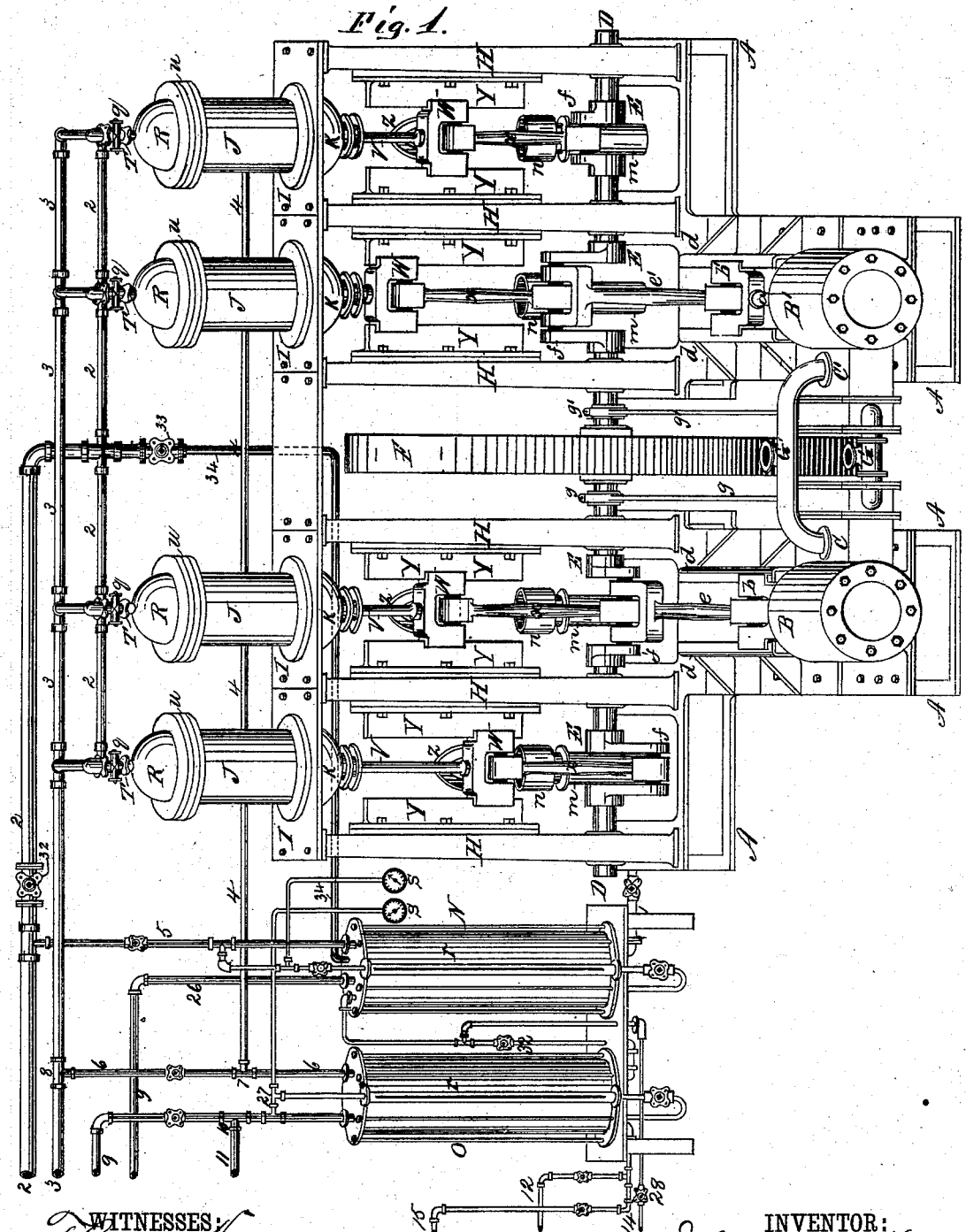

(No Model.) 3 Sheets—Sheet 2.
J. C. DE LA VERGNE & W. M. MIXER.
Ice Making Machinery.
No. 237,372. Patented Feb. 8, 1881.
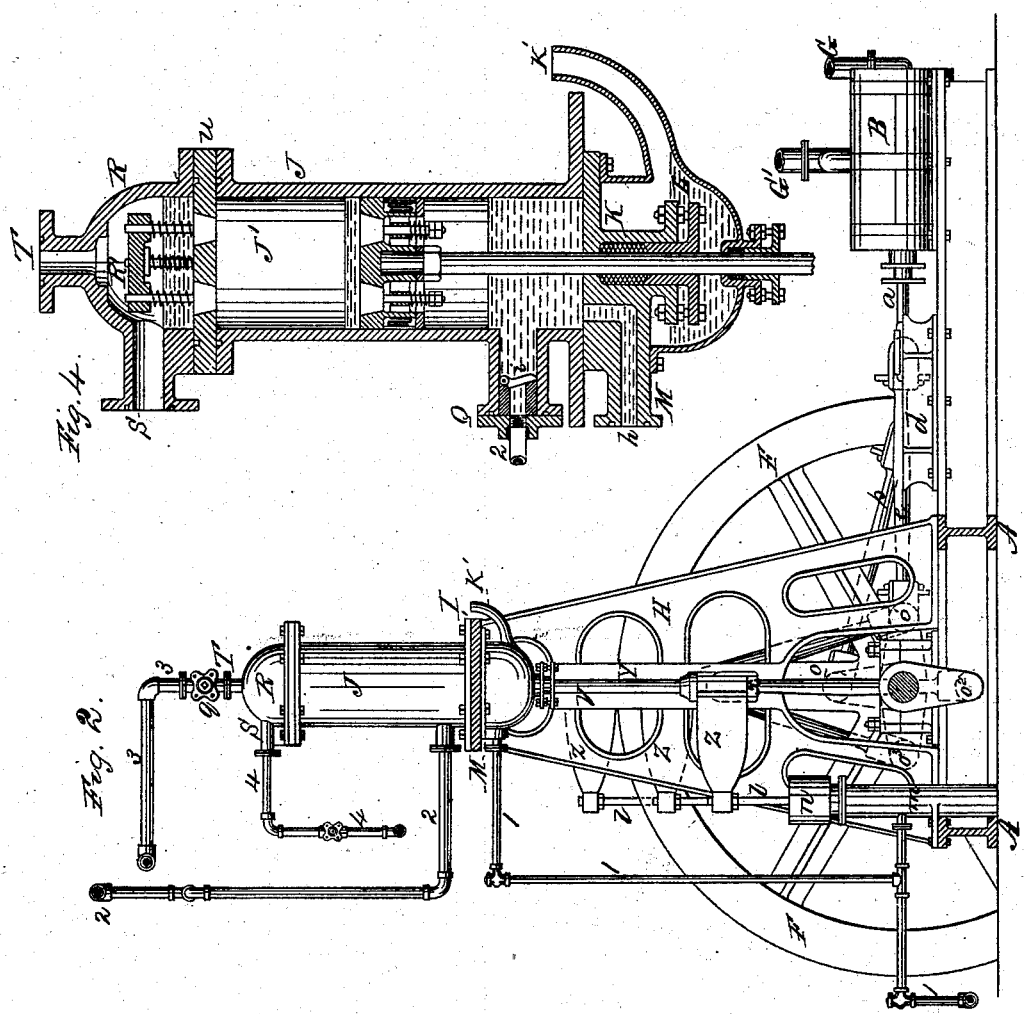

(No Model.) 3 Sheets—Sheet 3.
J. C. DE LA VERGNE & W. M. MIXER.
Ice Making Machinery.
No. 237,372. Patented Feb. 8, 1881.
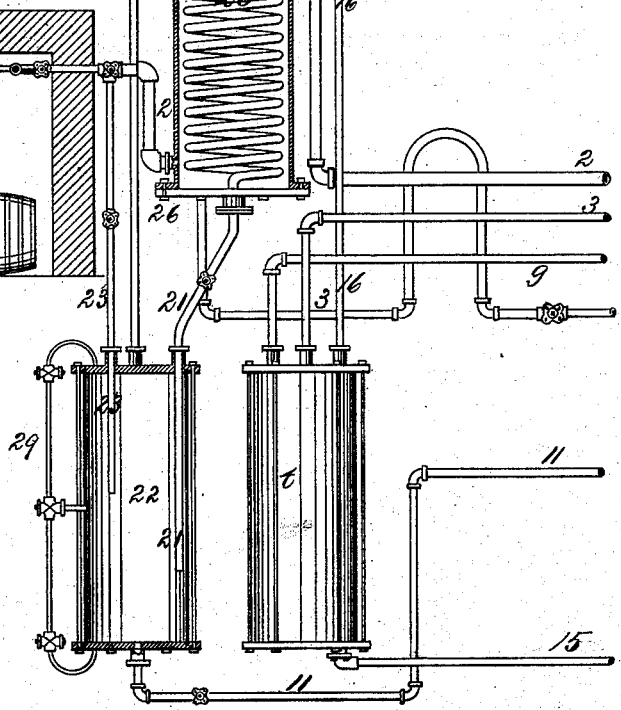
WITNESSES:
Thomas Hurley.
Henry E. Burr.
INVENTORS:
John C. De La Vergne
William M. Mixer
BY Josiah H. Macy.
ATTORNEY.

UNITED STATES PATENT OFFICE.

JOHN C. DE LA VERGNE AND WILLIAM M. MIXER, OF NEW YORK, N. Y.

ICE-MAKING MACHINERY.

SPECIFICATION forming part of Letters Patent No. 237,372, dated February 8, 1881.

Application filed October 30, 1880. (No model.)

*To all whom it may concern:*

Be it known that we, JOHN C. DE LA VERGNE and WILLIAM M. MIXER, residing in the city, county, and State of New York, have invented a certain new and Improved Process and Apparatus for Refrigerating or Ice-Making; and we do hereby declare that the following is a full, clear, and exact description of the invention, which will enable others skilled in the art to which it appertains to make and use the same.

The invention relates to that class of refrigerating or ice-making machinery wherein a volatile gas, preferably that of ammonia, is introduced into a compression or vacuum pump and is compressed to a state of liquefaction; the pressure being subsequently removed, the liquefied refrigerating agent expands with rapidity through tubes, tanks, or other chambers, and the frigorific effect produced by the volatile liquid again assuming its gaseous state is utilized for the absorption of heat.

In the prosecution of this system liquids have been used to seal the valves and joints and to lubricate the internal operating mechanism of the compression-pump; but a serious obstacle to the successful and economical working of the apparatus has been found to exist in the method of discharging the sealing and lubricating liquid upon its passage through the pump, or in exposing said liquid to the atmosphere after its discharge from the pump and before its reintroduction therein, permitting more or less of the refrigerating agent which was absorbed by the sealing and lubricating liquid while under pressure to escape, thus constantly diminishing and wasting the supply of said agent at each revolution of the crank-shaft. To remedy this defect a repeated introduction and discharge of the same sealing and lubricating liquid without exposure to the atmosphere to and from the compression or vacuum pump through closed connecting-pipes has been adopted.

In practice we find that all of the sealing and lubricating liquid is not immediately returned to the liquid-reservoir, but a considerable quantity of it passes off from the compression-pump in the form of vapor, froth, or liquid, and is carried by the pressure of the compressed refrigerating agent and the force exerted by the pump into the pressure-pipes, and thence to the condensing-coil and expanding-chambers. The result is, that the sealing and lubricating liquid is soon exhausted from the liquid-reservoirs. Consequently the internal operating mechanism of the pump is not properly sealed and lubricated, and thereby the pump becomes heated and great friction is produced, the refrigerating agent is forced past the piston and piston-rod, causing a rapid loss of power, the sealing and lubricating liquid exhausted from the liquid-reservoirs is driven into the pipes of the condensing-chamber, occupying space to the exclusion of an equal volume of the refrigerating agent, and from there into the expansion-chamber, where the room for the expansion of the liquefied agent is just so much diminished, and the capacity of said chamber for the absorption of heat is reduced to that extent. Nor is this all. The sealing and lubricating liquid is then forced from the expansion-chambers by the continuous flow and expansion of the compressed refrigerant, and is drawn by the compression or vacuum pump into its cylinders, greatly diminishing the capacity and power of the pump.

The object of this invention is to remedy the above-described objections, and, in addition thereto, to effect the discharge of a full complement of gas from the pump-cylinder at each revolution of the crank-shaft; to effectually seal the piston-rod with liquid, thereby preventing the introduction of air into the cylinder of the pump and thence into the pipes; to introduce the sealing and lubricating liquid from a liquid-reservoir or cooling-chamber, where it is held under pressure, to the compression or vacuum pump under a reduced pressure or entirely free from pressure; to cool the sealing and lubricating liquid before its introduction to the compression or vacuum pump, and to obtain a more steady and uniform action and pressure of the engine and pumps; and to this end the invention consists—

First, in the process of combining a sealing and lubricating liquid with a refrigerating agent—as ammoniacal gas—in its passage through the compression or vacuum pump, and then separating them before the admission of the refrigerating agent to the expansion pipes or chamber, or before it is again returned to the pump, as will hereinafter appear; and, Second, the invention also consists of a compression or vacuum pump, a condensing coil or chamber, an expansion coil or chamber, a reservoir for receiving a sealing and lubricating liquid, with means for introducing it into the compression or vacuum pump, and their intermediate connecting-pipes, in combination with a separating chamber or tank interposed between the compression or vacuum pump and the condensing-chamber, for the purpose of separating the sealing and lubricating liquid, or a part thereof, from the refrigerating agent before said agent enters the condensing coil or chamber, and for returning the same to the liquid-reservoir, as will hereinafter appear; and, Third, the invention further consists of a compression or vacuum pump, a condensing coil or chamber, an expanding-chamber, one or more liquid-reservoirs from which the sealing and lubricating liquid is supplied by a pump or other means to the compression or vacuum pump, and their intermediate connecting-pipes, in combination with a separating chamber or tank interposed between the condensing-chamber and the expansion-chamber, for the purpose of separating the sealing and lubricating liquid from the refrigerating agent before said agent enters the expansion coil or chamber, and for returning said liquid to the liquid-reservoir, as will hereinafter appear; and, Fourth, the invention further consists of a compression or vacuum pump, a condensing-chamber, an expansion-chamber, one or more liquid-reservoirs from which a sealing and lubricating liquid is supplied by suitable means to the compression or vacuum pump, and their intermediate connecting-pipes, in combination with a separating chamber or receiver placed on the suction or expansion side of the apparatus, between the expansion-chamber and the compression or vacuum pump, for the purpose of separating the sealing and lubricating liquid, or a part thereof, from the refrigerating agent after its passage through the expansion-chamber, but before its reintroduction to the compression or vacuum pump, and for returning the said liquid to the liquid-reservoir, as will hereinafter appear; and, Fifth, the invention also consists of a compression or vacuum pump, a condensing-chamber, an expansion-chamber, a liquid-reservoir for receiving the sealing and lubricating liquid, placed upon the pressure side of the apparatus, and their intermediate connecting-pipes, in combination with a liquid-reservoir or supply-tank, which receives the sealing and lubricating liquid on the expansion or suction side of the apparatus, and from which the said liquid is introduced to the compression-pump by an auxiliary pump or other suitable means, at a reduced pressure or free from pressure, and which tank is also used as a separator for the purpose of separating the sealing and lubricating liquid from the refrigerating agent before it is reintroduced into the compression or vacuum pump, as will hereinafter appear; and, Sixth, the invention also consists of a liquid-reservoir which receives the sealing and lubricating liquid under pressure, a liquid-reservoir for receiving the sealing and lubricating liquid under a reduced pressure or free from pressure, having a connecting-pipe, and a cock by which the said liquid may be wire-drawn from the reservoir under pressure to the reservoir with a lesser pressure, in combination with a compression or vacuum pump, an auxiliary pump for introducing the sealing and lubricating liquid into the compression-pump, a condensing-chamber, an expansion-chamber, and their intermediate connecting-pipes, by which the sealing and lubricating liquid is introduced into the compression or vacuum pumps to lubricate and seal the operating mechanism therein, and, passing from the compression or vacuum pump in combination with the refrigerating agent, may be separated therefrom before they are again returned to the said pump, as will hereinafter appear; and, Seventh, the invention also consists in the combination of the cooling coil and tank, or its equivalent, with the reservoirs for receiving the sealing and lubricating liquid, the compression or vacuum pump, and their intermediate connecting-pipes, by which the sealing and lubricating liquid, which is heated during the compression of the refrigerant, is cooled, as will hereinafter appear; and, Eighth, the invention further consists in the combination of a compression or vacuum pump, a liquid-reservoir for receiving the sealing and lubricating liquid under pressure, a liquid-reservoir for receiving the sealing and lubricating liquid under a lesser pressure, one or more separating tanks or receivers on the pressure side of the apparatus, between the compression or vacuum pump and the expansion-chamber, to separate the sealing and lubricating liquid, or a part thereof, from the refrigerating agent before said agent is admitted to the expansion-chamber, one or more separating tanks or receivers on the expansion or suction side of the apparatus, to separate the sealing and lubricating liquid that may have passed through the expansion-chamber from the refrigerating agent before said agent is again returned to the compression-pump, an auxiliary pump, or its equivalent, for introducing the sealing and lubricating liquid to the compression or vacuum pump, a condensing-chamber, an expansion-chamber, and their intermediate connecting-pipes, as will hereinafter appear; and, Ninth, the invention further consists of a vacuum or compression pump having a piston-rod which is liquid-sealed both inside and outside of the pump-cylinder to prevent air from being drawn into the pump-cylinder or the refrigerating agent drawn out of the pump-cylinder by the piston-rod, a liquid-sealed piston, with an air-chamber interposed between the piston and the lower part of said pump-cylinder, in combination with a condensing-chamber, an expansion-chamber, and their intermediate connecting-pipes, as will hereinafter appear; and, Tenth, the invention further consists of a compression or vacuum pump wherein the supply of sealing and lubricating liquid is introduced into the cylinder of said pump when charged with its full complement of the refrigerating agent, in combination with a condensing-chamber, an expansion-chamber, and their intermediate connecting-pipes, whereby the pump is readily made to discharge its full complement of gas at each revolution of the crank-shaft, as will hereinafter appear; and, Eleventh, the invention further consists in a crank-shaft having a crank at each quarter-section of its periphery, and having the connecting-rods connecting with the steam-pistons attached to cranks of the said shaft, which are at right angles with each other, to effect a more uniform pressure and action of the pumps and engine, as will hereinafter appear, all of which will be explained, reference being made to the specification and accompanying drawings, wherein similar letters represent similar parts.

The term "chamber" is applied to tanks, and a collection of pipes united by elbows or return-bends, wherein a large volume of gas is compressed or expanded, as the condensing-chamber and the expanding-chamber.

The cock 24 is for wire-drawing the liquefied gas from the condensing-chamber into the expansion-chamber. From this point back to the compression-pump is designated as the "pressure side" of the apparatus, and from this point forward to the compression or vacuum pump is designated as the "expansion" or "suction" side of the apparatus.

Figure 1 represents, in elevation, the engine, compressing-pumps, the reservoir for holding the sealing and lubricating liquid under pressure, and the reservoir for holding said liquid free from pressure, or under a reduced pressure, as desired, with the intermediate pipes which connect them with the various parts. Fig. 2 represents an end elevation of the apparatus with pumps, and driving-power in elevation, showing the relative position of each of the steam connecting-rods and pistons which drive the main shaft, and therefrom the compression or vacuum pumps, also the auxiliary pump for introducing the sealing and lubricating liquid into the compression-pumps, and the manner of accomplishing the same. Fig. 3 is a view of the main shaft, showing the cranks at each quarter-section of its periphery, whereby the power is equally divided and the pressure and motion made more uniform. Fig. 4 is a view of the compression-pump in section, showing the various divisions of said pump, the valved piston and valved diaphragm, the sealing and lubricating liquid, the induction-pipes for the admission of the refrigerating agent and the lubricant. Figs. 5, 6, and 7 are views, in elevation, of the coil and tank for cooling the sealing and lubricating liquid upon its return from the separating-tanks, or after its discharge from the compression-pump, but prior to its reintroduction therein, also the application to absorb heat in rooms, &c.

A A A A, Fig. 1, represent the bed-plate of the motive power and the compression-pumps. B and B' are the steam-cylinders. c and c' are the steam-chests. a and a' are the steam piston-rods. b and b' are the steam cross-heads. d d d d are guides for the steam cross-heads. D is the main shaft, having four cranks, which are shown operating at each quarter-section of the shaft D. e and e' are the connecting-rods connecting the steam cross-heads with the shaft D by the crank-pins f f of the second and third cranks. F is a large balance or fly wheel. g and g' are the steam-chest or cut-off rods, actuated by eccentrics. G is the induction steam-pipe. G' is the exhaust-steam pipe. This comprises the engine or motive power.

H H H H H are upright frames, which rest upon and are firmly secured to the bed-plate A, and which support the cross-plates I I I I, to which the air or gas compression pumps J J J J are secured.

K K K K are chambers which inclose that part of the compression-pumps extending below the cross-plates I I, and are fastened to the heads of the pumps by bolts to hold a liquid for sealing and lubricating the piston-rods outside of the pump-cylinders. The liquid is introduced therein through spouts K'. (Shown at Figs. 2 and 4.) The piston-rods, as they pass through the head of the pump, are packed in the usual way, having glands or followers L around them to compress the packing, and with similar packing-chambers on the outside of the chambers K, to prevent the escape of the sealing and lubricating liquid therefrom.

M is an extension on the rear side of the pump, having a passage-way, h, for the introduction of the sealing and lubricating liquid into the pump-cylinder, and is connected with the plunger-pump m and supply-tank N by the pipe 1. (Shown at Fig. 2.) On the rear side of the pumps J J J J, above the cross-plates I I I, are other flanged extensions, Q, (also shown in Figs. 2 and 4,) to which the suction gas-pipes 2 2 2 2 are attached, having a check-valve, i, opening inward.

R is a dome-shaped cap, forming the upper chamber of the compression-pump, having two flanged outlets, S and T. The outlet T connects with the gas-pressure pipe 3 3 3 3; the outlets S with the liquid-discharge pipes 4 4 4 4.

U is a diaphragm-plate having valves which afford communication between the two chambers of the pumps, and through which the compressed gas and the lubricating-liquid pass.

V represents the piston of the compression-pump.

W is the cross-head connected with the compression-pump pistons V and the compression-pump connecting-rods $x$; $x\,x$ connect with the cranks E and shaft D by crank-pins $f\,f$, which are common to both the second and third pumps and steam-cylinder rods.

Y Y Y are guides secured to the vertical frames H, upon which the cross-heads connected with the piston-rods of the compression-pumps slide.

Z Z are brackets secured to each of the cross-heads of the compression-pumps, and which operate the plungers $l\,l$ of the pumps $m$, which supply the sealing and lubricating liquid, a check-valve being introduced in the pipe 1 to prevent the return of said liquid.

$n\,n\,n$ are oil-cups for holding a body of oil surrounding the plungers $l$, which prevents air from being drawn into the cylinder and pipes by means of the plunger.

The dotted lines $o$ and $p$, Fig. 2, represent the position of the third crank and the second steam connecting-rod and piston. The position of the second crank and the first steam connecting-rod is shown at $o'$ and $e$. The position of the first crank will be as at $o^2$; that of the fourth crank as at $o^3$.

$q\,q$ are cocks placed as a matter of convenience in the gas-pressure pipes 3 3 3 3, that the gas may be shut off and the compression-pumps detached should occasion require it.

The tanks O and N are the depositories for the sealing and lubricating liquid, and from which it is circulated to seal the valves in the chambers of the compression or vacuum pumps, to seal the pistons and piston-rods working therein, to lubricate the internal operating parts of the pumps, and to cool said pumps by the absorption of a part of the heat produced by the compression of the gas. The tanks are provided with liquid-gages $r\,r$, to indicate the height of their contents, and have suitable pipe-connections to permit the ingress and egress of the sealing and lubricating liquid, and for the equalization of the gaseous pressure; also cocks or shut-off valves to aid in controlling the action of the machine and to stop the flow of liquid or gas in case of a necessity for repairs.

$s$ is a pressure-gage, and is connected with the tank O by a small pipe, to indicate the pressure within said tank and in the compression-chambers of the pumps and the condensing coils.

$s'$ is a pressure and vacuum gage to indicate the pressure in the suction-tank N, or the vacuum in said tank and pipes should a vacuum be produced, and is connected with the tank N and suction-pipes 2 and 5 by a small pipe extending upward from the liquid-gage $r$.

5 is a pipe which connects the supply-tank N with the return or suction gas-pipe 2, and can be used to equalize the pressure in the tank, and to return the expanded gas thereto in case it should be deemed desirable to use said tank as a separating-chamber on the expansion side of the apparatus, in which case the cock 32 would be closed, the cock 33 opened, and the gas be drawn into the cylinders of the compression-pumps through pipe 34.

6 is a pipe leading from the pressure oil-tank O, connecting at 7 with the liquid-discharge pipe 4 4, which conveys the surplus sealing and lubricating liquid flowing from the chamber R' of the pump J through the passage-way S back to the main body, and connects with the pressure gas-pipe 3 at 8, for the purpose of receiving more of the sealing and lubricating liquid, which may be driven off from the compression-pumps J J in the form of foam and carried by the force of the gas through the gas-pressure pipe 3 3 3, and which may condense on its passage to this point. It is also used as an equalizing-pipe. It is intersected at 10 by the pipe 11, which leads from the bottom of the separating-tank 22, and discharges the sealing and lubricating liquid therein into the liquid-pressure tank O. A small pipe attached to the pressure-gage $s$ connects with an extension of the liquid-gage $r$ at 27, and with the pipe 9 a little below the intersection at 10. The pipe 12 leads the sealing and lubricating liquid from the tank O to the cooling-coil 13, which is held in a box or receptacle, $v$, through which a constant stream of cold water is kept passing to absorb the heat which is imparted to the sealing and lubricating liquid by the compression of the gas in the pumps J J, and which, after being cooled, returns through pipe 14 to the suction-tank N, the flow and pressure being regulated by the stop-cock 28, attached to pipe 14. From the tank N the liquid for sealing and lubricating is supplied to the compression-pumps by the plunger-pumps $m\,m\,m\,m$.

$n\,n\,n\,n$ are oil-cups on the top of the plunger-pumps $m\,m\,m$, to prevent the air from being introduced into the apparatus.

15 is the pipe for returning any of the sealing and lubricating liquid which may have been collected by the separating-tank $t$ back to the liquid-reservoir O.

16 is a pipe connecting the separating-tank $t$ with the condensing-chamber 17, which is placed within a tank, 18, and cooled by a constant current of cold water being passed over and around it.

19 is a tank surrounding an auxiliary condensing-chamber, 20, in which the expanding freezing agent is discharged from the expansion-chambers, to further cool the liquefied freezing agent in the coil 20. This tank is also used as a separating-tank on the expansion or suction side of the apparatus, to collect any liquid that might possibly pass through the expansion-chambers and discharge it, or return it to the liquid-reservoir N through the pipe 26, for further use.

It is evident that the tank N may be used as a separating-tank on the expansion or suction side, and as a substitute in this respect for the tank 19, and thus prevent any liquid from being returned with the expanded refrigerating agent to the pump.

21 is an extension of the pipe forming the auxiliary condensing chamber or coil 20, which discharges the liquefied refrigerating agent, together with the sealing and lubricating liquid not hitherto collected, into the main separating-tank 22, which connects at its bottom with pipe 11, to return the said sealing-liquid to its reservoir O.

29 is a liquid-gage with a passage leading from its center to the middle of tank 22, also having both its ends connected with said tank and open for the circulation of liquid and gas, by which can be ascertained the approximate height of the liquefied gas and the sealing and lubricating liquid in said tank.

23 is a pipe leading from the top of the separating-tank 22, which connects with the expanding-chamber 25, through which the liquefied refrigerating agent passes from the tank 22, and is wire-drawn by the cock 24 into the chamber 25, where, by its rapid expansion, it is utilized in said chambers for the absorption of heat. The refrigerating agent is then returned through pipe 2 into the tank 19, where it may be used to cool the liquefied agent in the condensing-coil 20, or returned to the suction liquid-supply tank N, or to the pump direct through the suction-pipe 2, for recharging said pump again.

Having described the various parts, the operation of the apparatus is as follows: The apparatus being charged with a refrigerating agent, and the liquid-reservoirs for holding a sealing and lubricating liquid being also charged with such liquid, steam is admitted through the steam-supply pipe G and the apparatus put in motion. Upon the backward movement of the pistons of the compression-pumps the auxiliary pumps $m\ m\ m$ inject a predetermined quantity of sealing and lubricating liquid from the liquid-supply tank N into each of the pump-cylinders through the pipe 1 (shown in Figs. 1 and 2) and the passage-way $h$ of the compression-pump, as shown at Fig. 4. The cylinders of the several compression-pumps having been previously charged with their full complement of the refrigerating agent, the introduction of the sealing and lubricating liquid necessarily compresses the said agent and aids in the discharge of a larger quantity thereof at each discharge of the pump. The piston, upon completing its backward stroke, is submerged in the sealing and lubricating liquid and its valves and joints sealed. The charge of the refrigerating agent, having during the backward movement of the piston passed to its upper side in the chamber J', is now forced, by the forward movement of said pistons V, through the valves $j\ j\ j$ of the diaphragm U, and with it a greater part of the sealing and lubricating liquid, the face of the piston at the termination of the forward stroke being very close to the bottom of the diaphragm U. It is evident that but little of the sealing and lubricating liquid is retained upon its surface, and the only part of the charge of the refrigerating agent not forced through the diaphragm is that which may have been absorbed by the remnant of the sealing and lubricating liquid while under pressure. The pump-cylinder is again charged by the forward stroke of the piston. Upon its return-stroke the valves $j\ j\ j$ of the diaphragm U close, and are sealed by the sealing and lubricating liquid previously forced through. The refrigerating agent is driven out of the diaphragm-chamber R' through the passage-way T into the pressure-pipes 3 3 3. Upon the working of the pumps a body of the sealing and lubricating liquid collects in the liquid diaphragm-chamber till it is filled, when the surplus was supposed to overflow through the passage-way S and the liquid-discharge pipe 4 to the liquid-pressure reservoir O, to be used as before; but experience proves that the sealing and lubricating liquid becomes heated by the compression of the refrigerating agent, and a large body of it driven off, in the form of vapor, foam, and liquid, through the opening T into the gas-pressure pipe 3. Some of it may return through the pipe 6 to the reservoir O; but most of it passes onward through pipe 3 into the separating foam-tank $t$, where, by gravity and pressure, a considerable body of it is collected and returned through pipe 15 to the reservoir O. The tank is connected by pipe 9 with the reservoir O, to equalize the pressure between the two chambers. The refrigerating agent, with the remaining sealing and lubricating material, then passes from the tank $t$ through the pipe 16 to the condensing-chamber or coil 17, which is contained within the tank 18, and is there cooled by the flowing of a constant stream of cold water into said tank. The refrigerating agent and the sealing and lubricating material are, by the abstraction of the heat due to compression and the latent heat, here compressed to a state of liquefaction, which aids materially in the separation of the distinct compounds. From the condensing-chamber 17 they pass into the auxiliary condenser 20, placed within the tank 19, and are there reduced in temperature by the introduction of the expanded gas on its way back to the pump. From 20 the liquefied refrigerating agent and the remnant of the sealing and lubricating liquid pass into the main separating-tank 22, where, by the difference in their specific gravity, the sealing and lubricating liquid settles to the bottom of said tank, a body of which is held therein by the bent pipe 11, through which the surplus of said liquid flows on its return to the liquid-reservoir O. The refrigerant, floating upon the surface of this sealing and lubricating liquid, is permitted to escape by the opening of cock 24 into the expanding-chambers 25, where the frigorific effect produced by its rapid expansion may be utilized for the absorption of heat or the making of ice. From the expanding-chambers 25 the expanded refrigerant is discharged through the stop-cock 31 into the supply-pipe 2, and thence to the tank 19, where, as before stated, it is used to reduce the temperature of the condensing-coil 20 and its contents; thence it passes through the pipes 2 and 26 to the suction side and opening of the compression-pump, to be recompressed.

By an examination of the main shaft D it will be observed that the several cranks follow each other as numbered, 1, 2, 3, 4, while the steam connecting-rods connect with the second and third cranks, which are at right angles with each other, thus dividing the power exerted in compressing the gas between the four pumps. It is evident that the contents of each pump are discharged at every quarter-revolution of said shaft. By the time one pump completes its discharge another begins, which makes the flow of the refrigerating agent and the sealing and lubricating liquid to all intents and purposes continuous. Consequently the expansion of the liquefied refrigerating agent may also be continuous.

The pipe 30 in Fig. 6 is to equalize pressures in the separating-tank 22 and permit the sealing and lubricating liquid to flow back to the liquid-reservoir O by gravity.

It is evident that a sealing and lubricating liquid may be introduced and circulated within the apparatus in combination with a refrigerating agent, without separating them, with a limited result.

It is also evident that a better result may be obtained by the introduction of the separating-tank $t$ between the compression-pump and the condensing-chamber, thus preventing a part of the sealing and lubricating liquid from entering and occupying space in the expansion-chambers, and being forced therefrom to the compression-pumps.

A further improvement can be made by the use of the tank 19 as a separating-tank on the suction side of the expansion-chamber, in combination with the tank $t$ on the pressure side, and thereby reduce the quantity of sealing and lubricating liquid before passing it to the expansion-chamber, and after leaving them, but before entering the compression-pumps; or the separating-tank 19 might be used without the tank $t$; or the supply-tank N might be used as a separating-tank on the suction side; or both 19 and N might be used on the expansion or suction side, and separate the sealing and lubricating liquid from the refrigerating agent before it is passed to the compression-pump; or $t$ and N could be used, or 22 and $t$, and the sealing and lubricating liquid separated before entering the expanding-chambers, which is by far preferable. The full frigorific power of the gas would then be obtained, and the refrigerant could be returned directly to the pump free from the lubricant; or 22 might be used without $t$, or 22 and O, or 22 and O and N, or 22 and $t$ and 19.

It is obvious that the separating tanks or chambers could be interchanged in many forms; but we prefer to use each in the manner shown.

Having fully explained our invention, what we claim as new, and desire to secure by Letters Patent of the United States, is—

1. In a refrigerating or ice-making apparatus, the process of combining a sealing and lubricating liquid with the refrigerating agent in its passage through a compression or vacuum-pump, and then separating them before the admission of the refrigerating agent to the expansion pipes or chambers, or before said agent is again returned to the pump, substantially as set forth.

2. A compression or vacuum pump, a condensing-chamber, an expansion-chamber, a reservoir for receiving and supplying a sealing and lubricating liquid, with means for introducing it into a compression or vacuum-pump, and their intermediate connecting-pipes, all in combination substantially as described.

3. A compression or vacuum pump, a condensing-chamber, an expansion-chamber, a reservoir for receiving and supplying a sealing and lubricating liquid, with means for introducing it into a compression or vacuum pump, and their intermediate connecting-pipes, in combination with a separating chamber or tank interposed between the compression or vacuum pump and the condensing-chamber, to separate the sealing and lubricating liquid, or a part thereof, from the refrigerating agent before said agent enters the condensing coil or chamber, and returning the same to the liquid-reservoir, substantially as described.

4. A compression or vacuum pump, a condensing-chamber, an expanding-chamber, one or more reservoirs for the sealing and lubricating liquid, with suitable means for introducing said liquid into the compression or vacuum-pump, and their intermediate connecting-pipes, in combination with a separating chamber or tank interposed between the condensing-chamber and the expansion-chamber, for the purpose of separating the sealing and lubricating liquid, or a part thereof, from the refrigerating agent before said agent enters the expansion-chambers, substantially as herein set forth.

5. A compression or vacuum pump, a condensing-chamber, an expansion-chamber, one or more reservoirs from which a sealing and lubricating liquid is supplied to the compression or vacuum pump by suitable means, and their intermediate connecting-pipes, in combination with a separating chamber or receiver placed on the suction or expansion side of the apparatus, between the expansion-chamber and the compression or vacuum pump, for the purpose of separating the sealing and lubricating liquid, or a part thereof, from the refrigerating agent after its passage through the expansion-chamber, but before its reintroduction to the compression or vacuum pumps, substantially as described.

6. A compression or vacuum pump, a condensing-chamber, an expansion-chamber, a liquid-reservoir for receiving the sealing and lubricating liquid placed upon the pressure side of the apparatus, and their intermediate connecting-pipes, in combination with a liquid-reservoir or supply-tank which receives the sealing and lubricating liquid on the expansion or suction side of the apparatus, and from which the said liquid is introduced to the compression or vacuum pump by suitable means at a reduced pressure, or free from pressure, substantially as described.

7. A compression or vacuum pump, a condensing-chamber, an expansion-chamber, a liquid-reservoir for receiving the sealing and lubricating liquid, placed upon the pressure side of the apparatus, and their intermediate connecting-pipes, in combination with a liquid-reservoir or supply-tank which receives the sealing and lubricating liquid on the expansion or suction side of the apparatus, and from which the said liquid is introduced to the compression or vacuum pump at a reduced pressure, or free from pressure, when said tank or chamber is also used for the purpose of separating the sealing and lubricating liquid from the refrigerating agent before it is reintroduced into the compression or vacuum pump, substantially as set forth.

8. In a refrigerating or ice-making apparatus, a liquid-reservoir which receives the sealing and lubricating liquid under pressure, a liquid-reservoir for receiving the sealing and lubricating liquid under a reduced pressure, or free from pressure, both connected by a pipe having a cock or valve by which the said liquid may be drawn from the reservoir under pressure into the reservoir with a lesser pressure, in combination with a compression or vacuum pump, an auxiliary pump, or its equivalent, for introducing the sealing and lubricating liquid into the compression-pump, a condensing-chamber, an expansion-chamber, and their intermediate connecting-pipes, substantially as set forth.

9. In a refrigerating or ice-making apparatus, the combination of a cooling coil or chamber with one or more reservoirs for receiving the sealing and lubricating liquid, a compression or vacuum pump, and their intermediate connecting-pipes, by which the sealing and lubricating liquid, which is heated during the compression of the refrigerant, is cooled, substantially as set forth.

10. In a refrigerating or ice-making apparatus, the combination of a compression or vacuum pump, a liquid-reservoir for receiving the sealing and lubricating liquid under pressure, a liquid-reservoir for receiving the sealing and lubricating liquid under a lesser pressure, one or more separating tanks or chambers on the pressure side of the apparatus, one or more separating tanks or chambers on the expansion or suction side of the apparatus, an auxiliary pump, or its equivalent, for the introduction of the sealing and lubricating liquid into the compression or vacuum pump, a cooling-coil for cooling the lubricant, a condensing-chamber, an expansion-chamber, and their intermediate connecting-pipes, substantially as described.

11. In a refrigerating or ice-making apparatus, a compression or vacuum pump having a piston-rod liquid-sealed both inside and outside of the pump-cylinder, a liquid-sealed piston, with an air or gas chamber interposed between the piston and the head of the pump-cylinder through which the piston-rod passes, in combination with a condensing-chamber, an expansion-chamber, and their intermediate connecting-pipes, substantially as set forth.

12. In a refrigerating or ice-making apparatus, a compression or vacuum pump wherein the sealing and lubricating liquid is introduced into said pump-cylinder when charged with its full complement of the refrigerating agent, in combination with a condensing-chamber, an expansion-chamber, and their intermediate connecting-pipes, substantially as set forth.

13. In a refrigerating or ice-making apparatus, a compression or vacuum pump having an induction-passage for the refrigerating agent, a separate induction-passage for the sealing and lubricating liquid, a liquid-sealed piston, a liquid-sealed piston-rod, and an air or gas chamber between the piston and the head of the pump through which the piston-rod passes, in combination with a condensing-chamber, an expansion-chamber, and their intermediate connecting-pipes, substantially as described.

14. In a refrigerating or ice-making machine, an air or gas compressor having a crank-shaft with a crank at each quarter-section of its periphery, in combination with a condensing coil or chamber, an expansion-chamber, and their intermediate connecting-pipes, substantially as described.

In testimony whereof we have hereunto set our hands and seals in the presence of two subscribing witnesses.

JOHN C. DE LA VERGNE. [L. S.]
WILLIAM M. MIXER. [L. S.]

Witnesses:
WALTER W. MONTAGUE,
JOSIAH H. MACY.